(12) United States Patent
Kim et al.

(10) Patent No.: US 8,184,249 B2
(45) Date of Patent: May 22, 2012

(54) METHOD OF ALIGNING ALIGNMENT LAYER AND LIQUID CRYSTAL DISPLAY DEVICE HAVING ALIGNMENT LAYER ALIGNED BY THE SAME

(75) Inventors: Kyung Chan Kim, Gyeonggi-do (KR); Tae Hoon Yoon, Busan (KR); Jae Chang Kim, Busan (KR); Joo Hong Seo, Busan (KR); Chang Ho Oh, Gyeonggi-do (KR); Ji Chul Lim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 398 days.

(21) Appl. No.: 12/213,788

(22) Filed: Jun. 24, 2008

(65) Prior Publication Data
US 2009/0207356 A1 Aug. 20, 2009

(30) Foreign Application Priority Data

Feb. 19, 2008 (KR) .................. 10-2008-0014861
Apr. 7, 2008 (KR) .................. 10-2008-0031979

(51) Int. Cl.
*G02F 1/1337* (2006.01)
*G02F 1/13* (2006.01)
*G21G 5/00* (2006.01)

(52) U.S. Cl. ...... 349/129; 349/123; 349/187; 250/492.3
(58) Field of Classification Search ............ 349/123, 349/129, 187; 250/492.3
See application file for complete search history.

(56) References Cited

U.S. PATENT DOCUMENTS

| 5,808,705 A * | 9/1998 | Hishida et al. ............. 349/33 |
| 2005/0018115 A1* | 1/2005 | Liao et al. ............. 349/114 |
| 2007/0182900 A1* | 8/2007 | Hsiao et al. ............. 349/128 |
| 2007/0263151 A1* | 11/2007 | Hsiao et al. ............. 349/130 |

* cited by examiner

*Primary Examiner* — Mark Robinson
*Assistant Examiner* — Jerry Blevins
(74) *Attorney, Agent, or Firm* — Morgan, Lewis & Bockius LLP (57) ABSTRACT

A liquid crystal display device includes: a first substrate having a black matrix, a color filter layer and a common electrode; a second substrate having gate lines, data lines and thin film transistors connected to pixel electrodes; a first alignment layer on the first substrate; a second alignment layer on the second substrate; and a liquid crystal layer having a plurality of liquid crystal molecules and positioned between the first and second alignment layers, wherein each of the first and second alignment layers has a first area with ion-altered side chains and a second area with non-altered side chains.

19 Claims, 10 Drawing Sheets

METHOD OF ALIGNING ALIGNMENT LAYER AND LIQUID CRYSTAL DISPLAY DEVICE HAVING ALIGNMENT LAYER ALIGNED BY THE SAME

The present application claims the benefit of Korean Patent Application Nos. 2008-0014861 and 2008-0031979, filed in Korea on Feb. 19, 2008 and Apr. 7, 2008, respectively, both of which are hereby incorporated by reference in their entirety.

BACKGROUND OF THE INVENTION

1. Field of the Invention

Embodiments of the invention relate to a liquid crystal display (LCD) device, and more particularly, to a method of aligning an alignment layer for an LCD device being capable of controlling a pre-tilt angle of a liquid crystal layer and an LCD device having an alignment layer aligned by the same.

2. Discussion of the Related Art

Liquid crystal display (LCD) devices are the subject of significant research and development because of their low power consumption and high value. Among the known types of LCD devices, active matrix LCD (AM-LCD) devices, which have thin film transistors (TFTs) arranged in a matrix array, are the subject of significant research and development because of their high resolution and superior ability in displaying moving images. Each of the TFTs can be controlled to have ON or OFF state.

Generally, the LCD device is fabricated though an array substrate fabricating process, a color filter substrate fabricating process and a liquid crystal (LC) cell process. In the array substrate fabricating process, array elements, such as a TFT, a pixel electrode and so on, are formed on a first substrate. In the color filter substrate fabricating process, a color filter and a common electrode are formed on a second substrate. In the LC cell process, after the first and second substrates are attached, an LC layer is provided between the first and second substrates.

Figure 1:
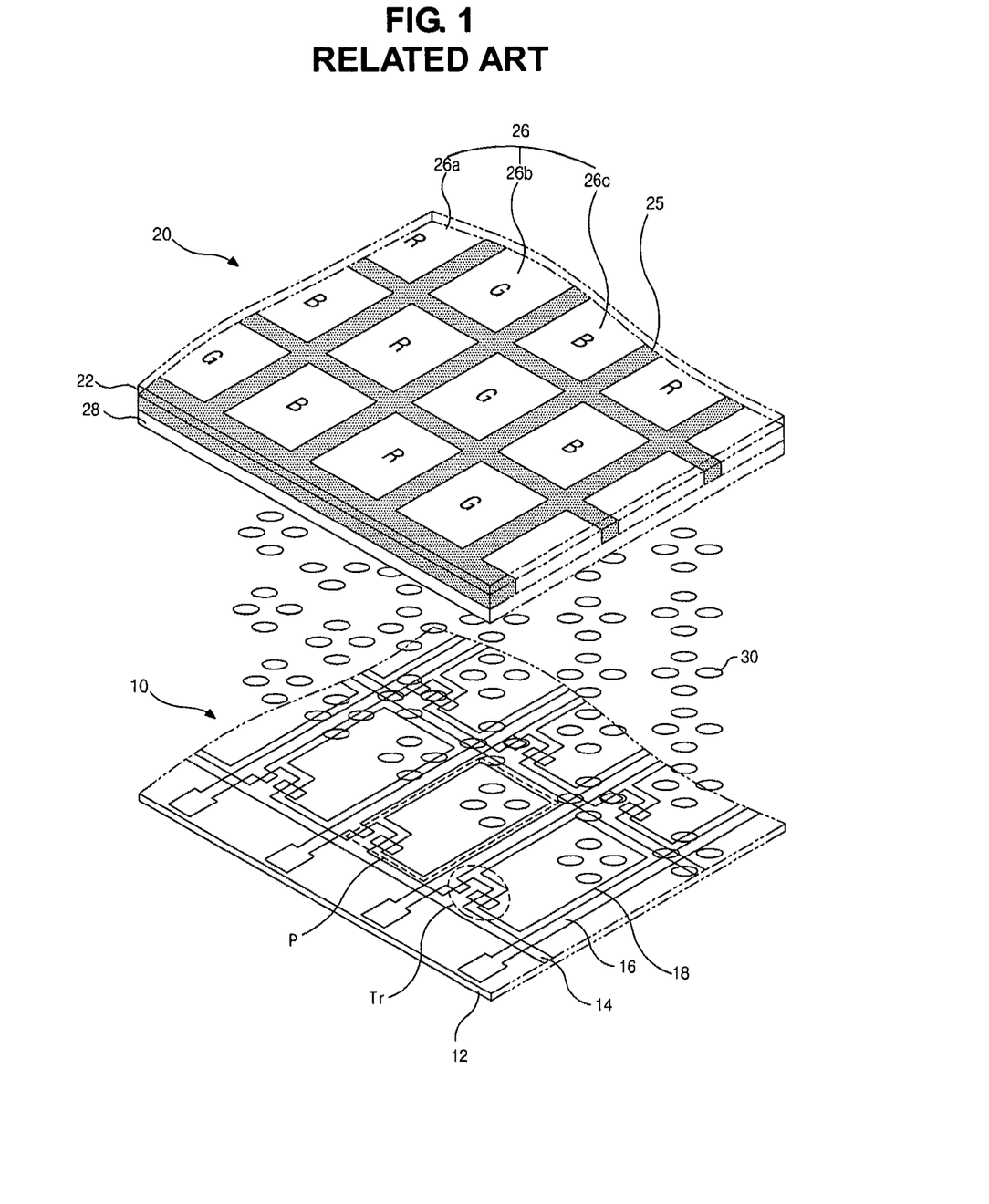
FIG. 1 is an exploded perspective view of a related art LCD device.

FIG. 1 is an exploded perspective view of a related art LCD device. The related art LCD device includes first substrate 12, second substrate 22, and a liquid crystal layer 30. The first and second substrates 12 and 22 face each other, and the liquid crystal layer 30 is interposed therebetween.

The first substrate 12 includes a gate line 14, a data line 16, a TFT "Tr", and a pixel electrode 18. The gate line 14 and the data line 16 cross each other such that a pixel region "P" is defined between the gate and data lines 14 and 16. The TFT "Tr" is formed adjacent to a crossing of the gate and data lines 14 and 16, and the pixel electrode 18 is formed in the pixel region "P" and connected to the TFT "Tr".

The second substrate 22 includes a black matrix 25, a color filter layer 26, and a common electrode 28. The black matrix 25 has a lattice shape to cover a non-display region of the first substrate 12, such as the gate line 14, the data line 16, the TFT "Tr". The color filter layer 26 includes first sub-color filters 26a, second sub-color filters 26b, and third sub-color filter 26c. Each of the sub-color filters 26a, 26b, and 26c has one of red, green, and blue colors R, G, and B and corresponds to the each pixel region "P". The common electrode 28 is formed on the black matrix 25 and the color filter layers 26 and over an entire surface of the second substrate 22. The first substrate 12, which includes the TFT "Tr", the pixel electrode 18 and so on, is referred to as an array substrate 10, and the second substrate 22, which includes the color filter layer 26, the common electrode 28 and so on, is referred to as a color filter substrate 20.

The LCD device can be fabricated through following processes.

First, an array pattern including a plurality of switching elements, a plurality of pixel electrodes, a gate line, a data line and pads is formed on the first substrate. The array pattern can be formed through a deposition process, a photo-lithography process and an etching process. The gate and data lines cross each other to define a pixel region. Each switching element is disposed each pixel region. Each of the plurality of pixel electrodes corresponds to each pixel region and is connected to the switching element. The pads are disposed at an end portion of the gate line and the data line. This process can be referred to as an array substrate fabricating process.

Meanwhile, a black matrix and a color filter layer including red, green and blue color filter patterns are formed on the second substrate. A common electrode is formed on the black matrix and the color filter layer to face the pixel electrode on the first substrate. This process can be referred to as a color filter substrate fabricating process.

Next, a liquid crystal layer is interposed between the first and second substrate, and then the first and second substrate are attached to each other such that a liquid crystal panel is fabricated. This process can be referred to as a cell process.

The LCD device uses electro-optical properties of liquid crystal molecules. The electro-optical properties result from optical anisotropy and arrangement of the liquid crystal molecules. Accordingly, high quality images are obtained by control of the arrangement of the liquid crystal molecules. To control an initial arrangement of the liquid crystal molecules, an aligning process is performed on an alignment layer.

The alignment process includes an alignment layer forming process and an aligning process on a surface of the alignment layer. In the alignment layer forming process, an alignment material is coated onto a substrate to form the alignment layer. In the aligning process, the alignment layer is treated to form a polymer chain arranged along one direction.

Particularly, in the alignment layer forming process, an alignment material, for example, polyimide, is coated onto a substrate to form the alignment layer having uniform thickness. The substrate can be one of the array substrate and the color filter substrate. In more detail, the alignment layer is disposed at an active region where the liquid crystal layer is formed. Accordingly, when the alignment layer is formed over an entire surface of the substrate by a spin coating method, an etching process is required to remove a portion of the alignment layer at a non-display region about the periphery of the active region. Accordingly, to avoid any additional processes, such as the etching process, the alignment layer is formed on the active region but not on the non-display region by using a transcription plate. The transcription plate is already patterned to correspond to the active regions on the substrate.

Next, the substrate including the alignment layer is treated in a drier and a hardening apparatus to remove moisture in the alignment layer and to achieve a desired hardness.

Next, a surface of the alignment layer is treated to form a polymer chain arranged along one direction on the surface of the alignment layer. The treatment process can be referred to as a rubbing process.

Hereinafter, a related art rubbing process is explained with reference to the accompanying drawings.

Figure 2A:
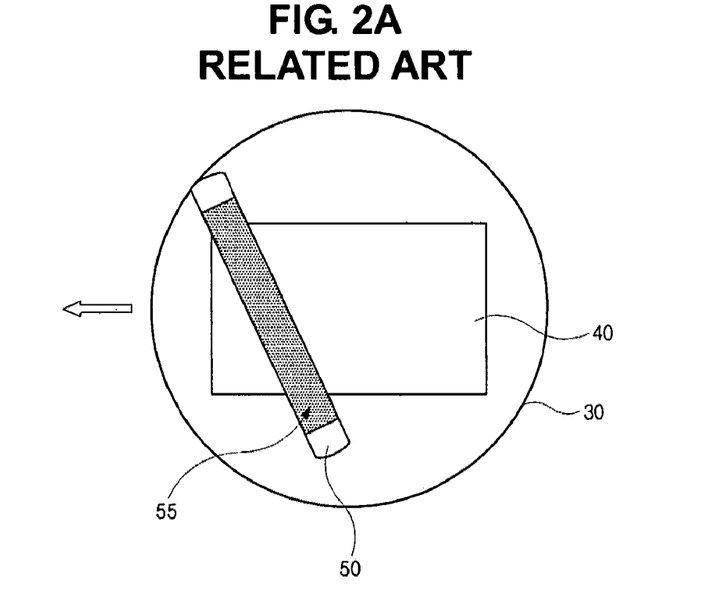
FIGS. 2A and 2B are plane views and a cross-sectional view showing a related art rubbing process, respectively.
Figure 2B:
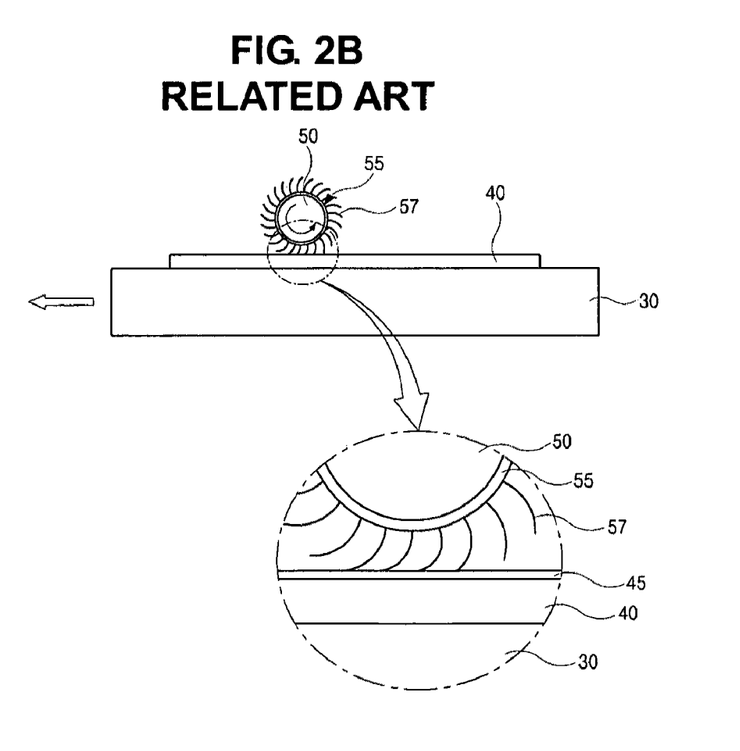

FIGS. 2A and 2B are plane views and a cross-sectional view showing a related art rubbing process, respectively. In FIG. 2A, a substrate 40 where an alignment layer (not shown) is disposed on a stage of a rubbing apparatus. And then, a rubbing roll 50 is disposed over the substrate 40 and rotated. Rubbing cloth, which is formed of rayon, is wound on the rubbing roll 50. Referring to FIG. 2B, when the rubbing roll 50 is rotated, the rubbing cloth 55 contacts and rubs a surface of the alignment layer 45. When the rubbing cloth 55 contacts the alignment layer 45, the stage 30 or the rubbing roll 50 moves along a direction such that an entire surface of the alignment layer 45 is rubbed by the rubbing cloth 55. As a result, a polymer chain, which is referred to as a side chain, is arranged along a direction on a surface of the alignment layer 45. Due to the side chain, liquid crystal molecules on the surface of the alignment layer 45 have a pre-tilt angle with respect to the alignment layer 45. The pre-tilt angle is defined as an angle between a major axis of the liquid crystal molecule and a surface of the alignment layer or the substrate.

In a twisted-nematic (TN) mode LCD device and an in-plane switching (IPS) mode LCD device, the pre-tilt angle can be 0 to 3 degrees. Generally, a horizontal type alignment layer is rubbed such that the liquid crystal molecule has a pre-tilt angle of 0 to 3 degrees. Before the alignment layer is rubbed, a side chain of the horizontal type alignment layer is substantially horizontal to the surface of the alignment layer. On the other hand, in a vertical type alignment (VA) mode LCD device, the liquid crystal molecule has a pre-tilt angle of 89 to 90 degrees. The vertical type alignment layer is first formed and then rubbed.

Recently, a new mode of LCD device has been introduced in which the alignment layer is required to be rubbed to have a pre-tilt angle of 20-70 degrees. Namely, the alignment layer is required to be capable of having a controllable pre-tilt angle. To meet the requirement, blending of polymer materials having different properties have been researched. However, since the blending is very difficult, there is no practical use. Moreover, a controllable pre-tilt angle can be obtained by forming a horizontal type alignment layer and a vertical type alignment layer with controlled rubbing densities on each of them. However, such a process requires forming alignment layers at least twice. Accordingly, there are problems that production time and production costs increase.

In addition, a controllable pre-tilt angle may be obtained by using transcription plates having different patterns. However, the transcription plate has ductility such that there is no reliability.

On the other hand, at least two rubbing processes cause some other problems. When the rubbing cloth contacts the alignment layer, a hair of a surface of the rubbing cloth is separated such that particles are generated. Moreover, because the rubbing cloth itself generates fine dusts, there are some problems in a fabricating process of the LCD device where an excellent cleaning is required. Further, disconnection of the electrical lines on the substrate and degradation of properties in the switching element can occur due to static electricity being generated between the rubbing cloth and the alignment layer. Furthermore, as the substrate becomes larger, the rubbing cloth is required to be longer. When the longer rubbing cloth is rotated, an eccentric force increases that causes vibrations in the rubbing roll to also increase. Such vibrations cause the aligning properties of the resultant alignment film to be non-uniform.

Recently, the LCD device is required to have fast response time and a wide viewing angle. To meet these requirements, an optically compensated bend (OCB) mode LCD device has been introduced. Due to symmetrical arrangement in liquid crystal molecules with respect to a center line in a liquid crystal layer, a compensating plate is not required. Accordingly, there is an advantage in production cost.

Figure 3A:
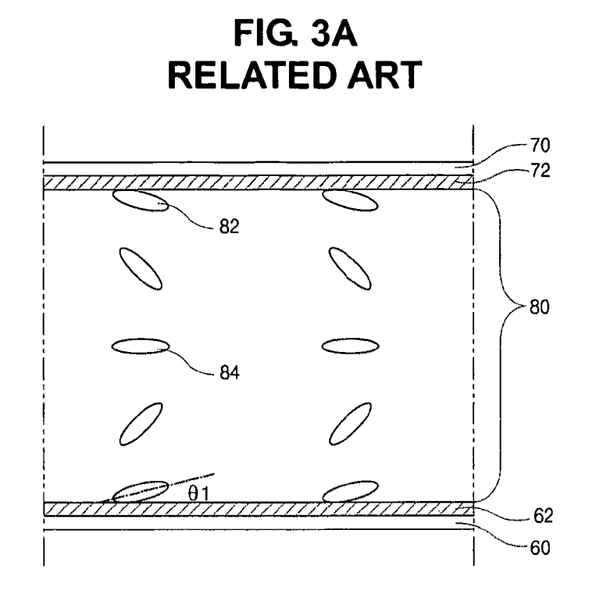
FIGS. 3A to 3C are schematic cross-sectional views showing arrangements of liquid crystal molecules in a related art OCB mode LCD device, respectively.
Figure 3B:
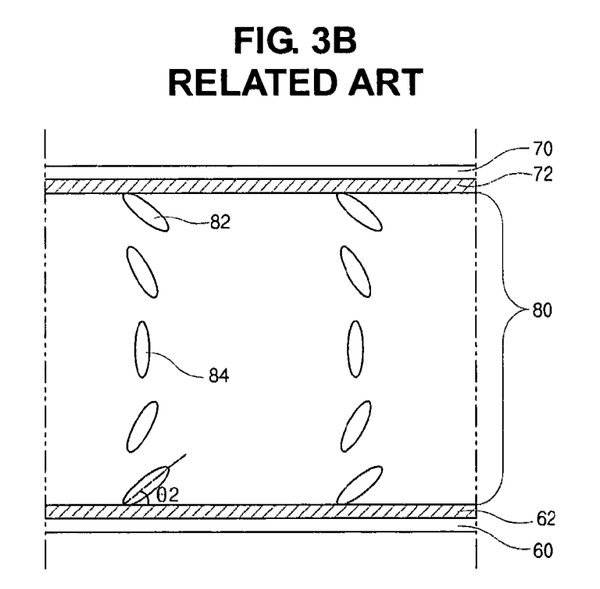
Figure 3C:
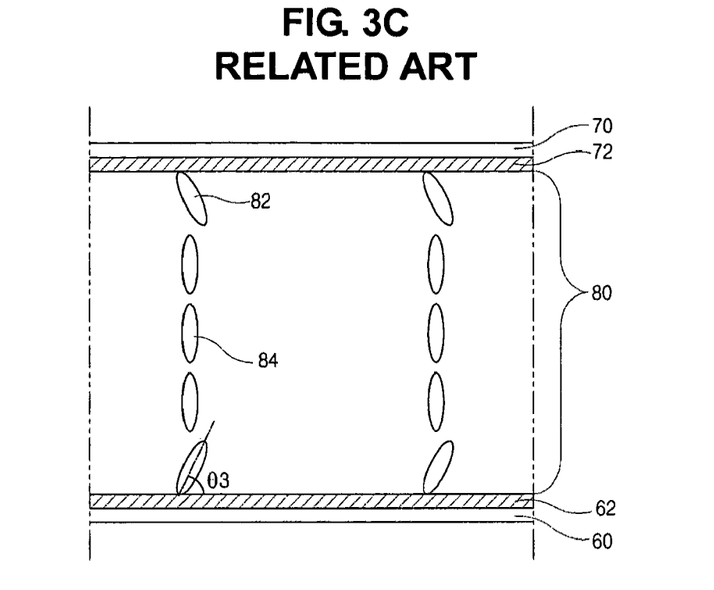

FIGS. 3A to 3C are schematic cross-sectional views showing arrangements of liquid crystal molecules in a related art OCB mode LCD device, respectively. FIGS. 3A to 3C respectively show a splay state, a bend-I state and a bend-II state.

The OCB mode LCD device includes a first substrate 60, a second substrate 70 and a liquid crystal (LC) layer 80 therebetween. A first alignment layer 62 is disposed over the first substrate 60, and a thin film transistor (not shown) as a switching element and a pixel electrode (not shown) are disposed between the first alignment layer 62 and the first substrate 60. A second alignment layer 72 is disposed over the second substrate 70, and a color filter layer (not shown) and a common electrode (not shown) are disposed between the second alignment layer 72 and the second substrate 70. The LC layer 80 including liquid crystal (LC) molecules 82 and 84 are disposed between the first and second alignment layers 62 and 72.

In FIG. 3A showing the splay state where voltages are not applied, first LC molecules 82 adjacent to one of the first alignment layer 62 and the second alignment layer 72 are symmetric to each other with respect to a second LC molecule 84 in a center of the LC layer 80. In this case, a first pre-tilt angle $\theta 1$ of the first LC molecules 82 is about 1 degree to about 3 degrees with respect to one of the first and second alignment layers 62 and 72 (or first and second substrates 60 and 70). On the other hand, the second LC molecule 84 is substantially parallel to one of the first and second alignment layers 62 and 72 (or first and second substrates 60 and 70).

When a first voltage is applied, the OCB mode LCD device has the bend-I state in FIG. 3B. The first voltage may be referred to as an initial voltage. In the bend-I state, the OCB mode LCD device has an ON state and displays a white image. In this case, the first LC molecules 82 has a second pre-tilt angle $\theta 2$ greater than the first pre-tilt angle $\theta 1$ in the splay state. The second LC molecule 84 is arranged to be substantially perpendicular to one of the first and second substrates 60 and 70.

On the other hand, when a second voltage being greater than the initial voltage is applied, the OCB mode LCD device has the bend-II state in FIG. 3C. The second voltage can be referred to as a driving voltage. In the bend-II state, the OCB mode LCD device has an OFF state and displays a black image. In this case, the first LC molecules 82 has a third pre-tilt angle $\theta 3$ greater than the second pre-tilt angle $\theta 2$ in the bend-I state. The second LC molecule 84 is arranged to be substantially perpendicular to one of the first and second substrates 60 and 70.

Figure 4:
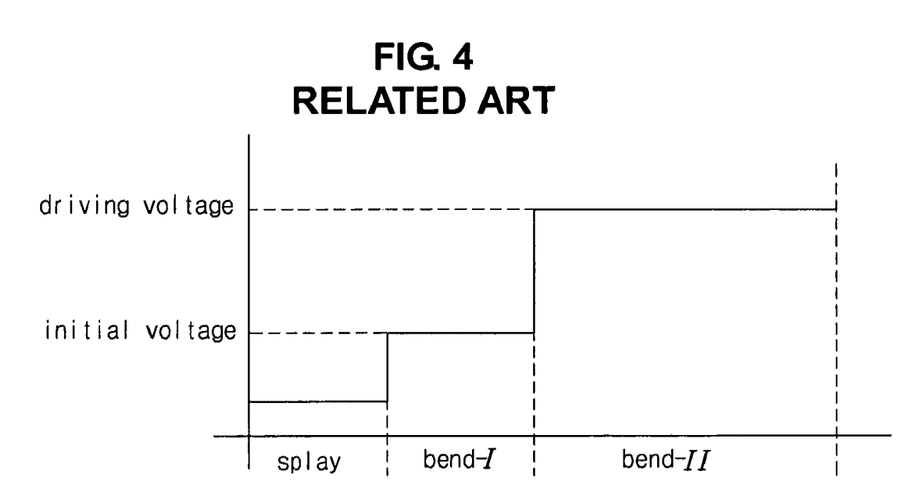
FIG. 4 showing relation between states of a related art OCB mode LCD device and applying voltages.

Referring to FIG. 4 showing relation between states of the OCB mode LCD device and applying voltages, since the OCB mode LCD device can displays images in the bend-I state and the bend-II state, it has fast response time. Namely, when the driving voltage is applied to the LC molecules in the bend-I state where the LC molecules adjacent to the first and second alignment layers have the second pre-tilt angle being greater than the first pre-tilt angle in the splay state, it is possible to obtain fast response time. However, since the LC molecules have to be the bend-I state, it is required to apply the initial voltage, which causes an increase in power consumption.

SUMMARY OF THE INVENTION

Accordingly, embodiments of the invention are directed to a method of aligning an alignment layer and a liquid crystal display device having an alignment layer aligned by the same that substantially obviates one or more of the problems due to limitations and disadvantages of the related art.

An object of embodiments of the invention is to provide a liquid crystal layer in a bend-I state of an optically compensated bend mode for a liquid crystal display device.

Another object of embodiments of the invention is to provide a method for forming a single alignment layer capable of controlling a pre-tilt angle of a liquid crystal layer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of embodiments of the invention, as embodied and broadly described, a method of aligning an alignment layer for a liquid crystal display device includes forming an alignment layer on a substrate such that the alignment layer has side chains protruding from a surface of the alignment layer, positioning the substrate with alignment layer on a stage of an ion beam irradiating apparatus, forming a non-altered area in the alignment layer by switching OFF an ion generator while one of the stage and ion generator is moving, and forming an ion-altered area in the alignment layer by switching ON the ion generator while the one of the stage and ion generator is stopped.

In another aspect, a liquid crystal display device includes: a first substrate having a black matrix, a color filter layer and a common electrode; a second substrate having gate lines, data lines and thin film transistors connected to pixel electrodes; a first alignment layer on the first substrate; a second alignment layer on the second substrate; and a liquid crystal layer having a plurality of liquid crystal molecules and positioned between the first and second alignment layers, wherein each of the first and second alignment layers has a first area with ion-altered side chains and a second area with non-altered side chains.

In another aspect, a method of aligning an alignment layer for a liquid crystal display device includes forming an alignment layer on a substrate such that the alignment layer has side chains protruding from a surface of the alignment layer, positioning the substrate with alignment layer on a stage of an ion beam irradiating apparatus, forming an ion-altered area in the alignment layer by stopping one of the stage and ion generator while an ion generator is turned ON in a first interval, and forming a non-altered area in the alignment layer by moving one of the stage and ion generator while the ion generator is turned ON in a second interval shorter than the first interval.

In yet another aspect, a liquid crystal display device includes: a first substrate having a black matrix, a color filter layer and a common electrode; a second substrate having gate lines, data lines and thin film transistors connected to pixel electrodes; a first alignment layer on the first substrate; a second alignment layer on the second substrate; and a liquid crystal layer of liquid crystal molecules positioned between the first and second alignment layers, wherein the liquid crystal molecules include first liquid crystal molecules at a first pre-tilt angle adjacent to one of the first and second alignment layers, second liquid crystal molecules at a second pre-tilt angle adjacent to the one of the first and second alignment layers, and third liquid crystal molecules at a third pre-tilt angle, which is smaller than the first pre-tilt angle and greater than the second pre-tilt angle, adjacent to the first and second liquid crystal molecules.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 5:
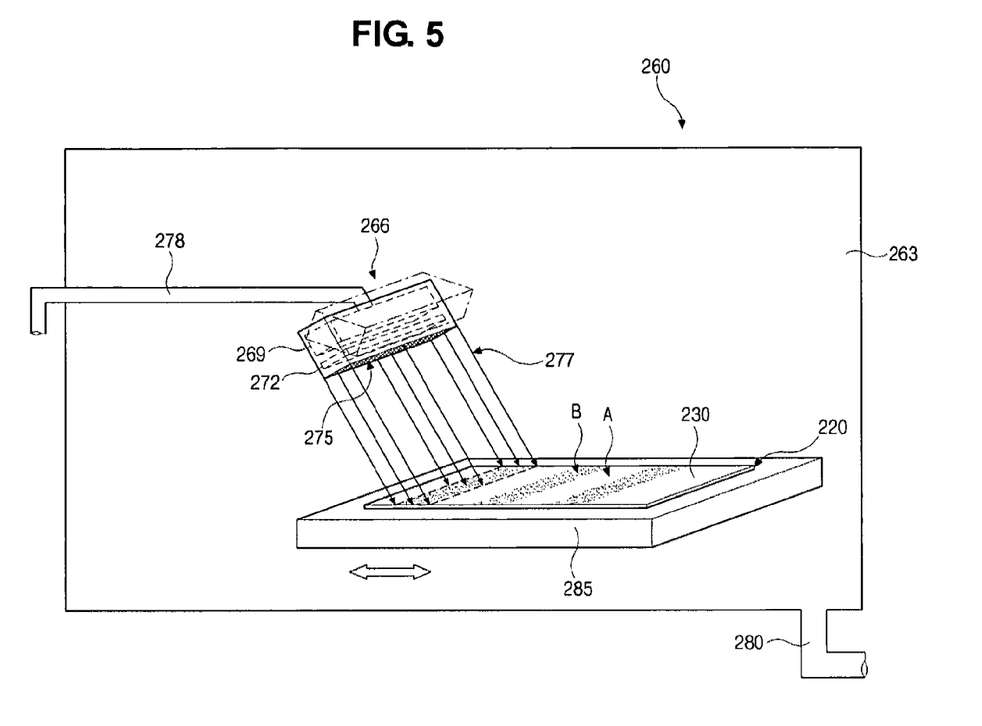
FIG. 5 is a schematic perspective view showing an ion beam irradiating apparatus for aligning an alignment layer having a controllable pre-tilt angle according to embodiments of the invention.

FIG. 5 is a schematic perspective view showing an ion beam irradiating apparatus for aligning an alignment layer having a controllable pre-tilt angle according to embodiments of the invention. An ion beam irradiating apparatus for a method of aligning an alignment layer will be explained with reference to FIG. 5. As shown in FIG. 5, the ion beam irradiating apparatus 100 includes a chamber 150, an ion generator 110 inside the chamber 150 and a stage 140 for receiving a substrate. The chamber 150 is connected to a vacuum pump (not shown) via a pipe 155 to provide a vacuum. A gas supplying pipe 130 is connected to the ion generator 110 to supply gases for generating ions. During the irradiation of ions onto the substrate 145, the chamber 150 has a vacuum within a range of about $10^{-7}$ Torr to about 760 Torr (atmospheric pressure).

The ion generator 110 includes a plasma generating unit 115, an accelerating electrode 120 and an ion exhausting portion 123. The plasma generating unit 115 dissociates gases supplied from the gas supplying pipe 130 into ions, and the ions generated from the plasma generating unit 115 are exhausted through the ion exhausting portion 123. Before being exhausted, the ions are accelerated by the accelerating electrode 120 to have pre-determined velocity and energy. The ion exhausting portion 123 has a width equal to or smaller than the width of the substrate 145. When an inert gas is supplied into the ion generator 110 and a high voltage is applied to the plasma generating unit 115, plasmas are generated and the inert gas is dissociated. As a result, the ions are generated. And then, the ions are accelerated by the accelerating electrode 120. The accelerated ions are provided into the chamber 150 through the ion exhausting portion 123 having a grid shape. The ions collide into the alignment layer (not shown) on the substrate 145 in the chamber 150 such that a side chain of the alignment layer (not shown) is altered. And then, the ions are exhausted via the pipe 155 from the chamber 150. The inert gas includes one of helium (He), neon (Ne), argon (Ar), krypton (Kr) and xenon (Xe). Considering cost, the inert gas can be Ar.

At least one of the ion generator 110 and the stage 140 is movable along a first direction. (In FIG. 5, the stage 140 is movable along the first direction.) Irradiation of ions onto the substrate 145 can be stopped during moving in the first direction. When the ion exhausting portion 123 has a width being equal to or smaller than the substrate 145, the ion generator 110 can move across an entire surface of the substrate 145 along the second direction.

When ions are irradiated during a very short interval, such as less than 0.1 sec, or the ion generator 110 is turned OFF while moving the ion generator 110 along the substrate 145 in the first direction, the surface of the substrate 145 in front of the ion exhausting portion 123 is non-altered. On the other hand, when ions are irradiated during a long interval, such as more than 0.1 sec, the surface of the substrate 145 in front of the ion exhausting portion 123 is irradiated. Particularly, when the ion generator 110 or the stage 140 is stopped while the ion generator 110 is turned ON, ion-altered areas "IA" are formed on the substrate 145.

The ion-altered areas "IA" are formed in an alignment layer (not shown) on the substrate 145. When the ion generator 110 or the stage 140 moves, the ion generator 110 is turned OFF to stop generating ions or a turned ON ion generator 110 is moved quickly to form a non-altered area in the alignment layer on the substrate 145. When the ion generator 110 or the stage 140 stops again, a turned ON ion generator 110 generates the ions to form another ion-altered area "IA". Accordingly, the non-altered area is disposed between two adjacent ion-altered areas "IA". Further, an ion-altered area "IA" can also be disposed between two adjacent non-altered areas.

Hereinafter, an aligning method according to embodiments of the invention is explained.

Figure 6A:
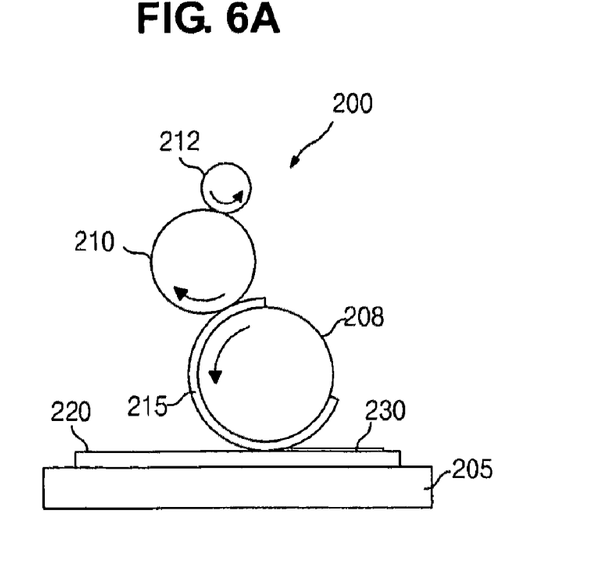
FIGS. 6A and 6B show fabricating processes of an alignment layer having a controllable pre-tilt angle using an ion beam irradiating apparatus in FIG. 5.
Figure 6B:
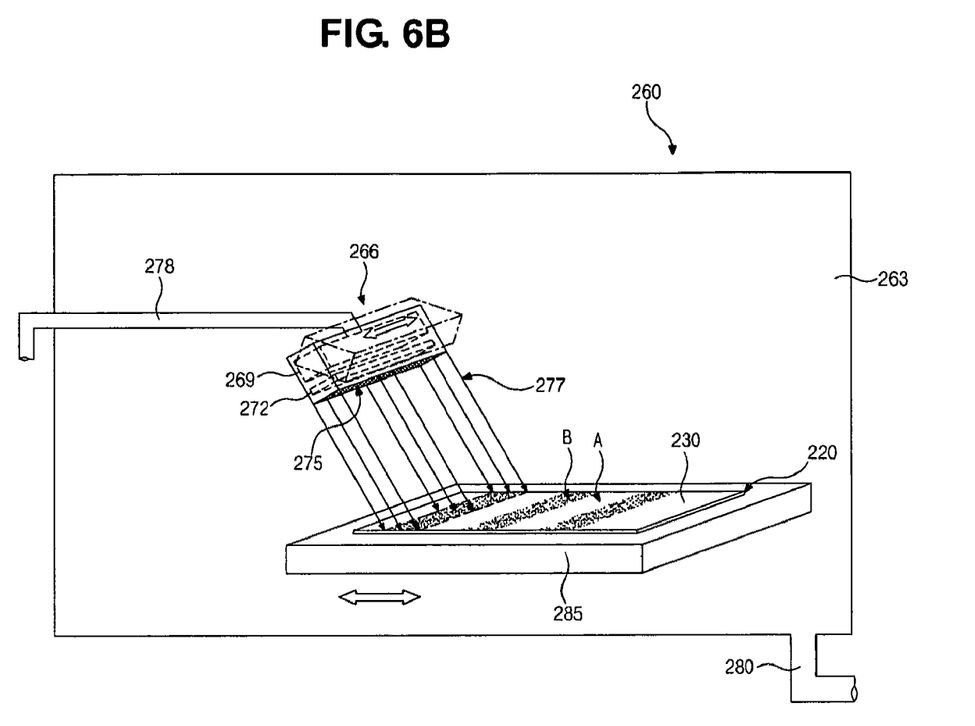
Figure 7A:
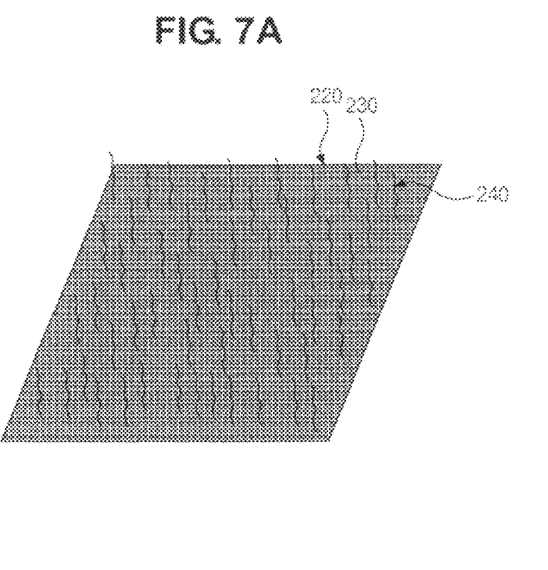
FIGS. 7A and 7B are schematic perspective views showing a surface of an alignment layer before and after aligning method according to embodiments of the invention.
Figure 7B:
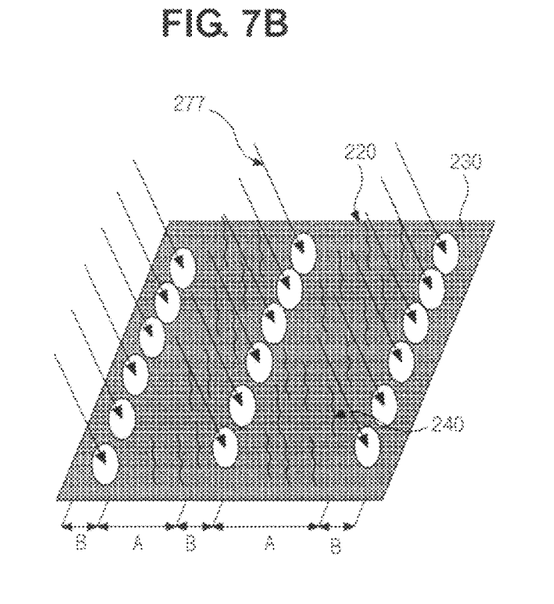

FIGS. 6A and 6B show fabricating processes of an alignment layer having a controllable pre-tilt angle using an ion beam irradiating apparatus in FIG. 5, and FIGS. 7A and 7B are schematic perspective views showing a surface of an alignment layer before and after aligning method according to embodiments of the invention.

In FIG. 6A, an alignment layer 230 is formed on a substrate 220 disposed on a stage 205. The alignment layer 230 has a side chain extending perpendicular to a surface of the alignment layer 230. Thus, the alignment layer 230 is a vertical type alignment layer. The substrate 220 can be one of an array substrate and a color filter substrate for an LCD device. When the substrate 220 is the array substrate, gate and data line (not shown) crossing each other, a thin film transistor (not shown) as a switching element, and a pixel electrode (not shown) connected to the thin film transistor (not shown) are formed on the array substrate. On the other hand, when the substrate 220 is the color filter substrate, a color filter layer (not shown) and a common electrode (not shown) are formed on the color filter substrate. In the LCD device, the array substrate and the color filter substrate are attached with a liquid crystal layer therebetween.

The alignment layer 230 can be formed by using an alignment printing apparatus 200. The alignment printing apparatus 200 includes a doctor roll 212, a doctor blade (not shown), an anilox roll (210), a printing roll 208 and a stage 205. A transcription plate 215 is attached onto a surface of the printing roll 208. A polymer material for the alignment layer 230 is coated on the transcription plate 215 by the anilox roll 210, and then the printing roll 208 is rotated and the stage 205 moves along a direction such that the transcription plate 215 contacts a surface of the substrate 220. As a result, the alignment layer 230 is formed on the surface of the substrate 220 to have a desired shape. And then, the substrate where the alignment layer 230 is formed is treated in a drier and a hardening apparatus such that the alignment layer 230 has a desired thickness, for example, about 500 angstroms to about 1500 angstroms, and a desired hardness, for example, about 1 hardness (H) to about 4 hardness (H).

Referring to FIG. 7A, the alignment layer 230, which is formed through the above-mentioned process, on the substrate 220 includes a base layer (not shown). In the base layer, main chains are entangled with each other such that the base layer has an upper surface being substantially parallel to an upper surface of the substrate 220. Further, side chains 240 protruding from the base layer. Since the alignment layer is a vertical type, the side chains 240 are substantially perpendicular to the upper surface of the base layer. For example, the side chains 240 have an angle of about 87 degrees to about 90 degrees with respect to the surface of the substrate 220.

Referring to FIGS. 6B and 7B, an ion beam 277 is irradiated onto the alignment layer 230 having the side chains 240 (of FIG. 7A) by using the ion beam irradiating apparatus 260. As mentioned above, the ion beam irradiating apparatus 260 includes a chamber 263, an ion generator 266 inside the chamber 263 and a stage 285 on which the substrate 220 is disposed. The chamber 263 is connected to a vacuum pump (not shown) via a pipe 280 to provide a vacuum. A gas supplying pipe 278 is connected to the ion generator 266 to supply gases for generating ions. The ion generator 266 includes a plasma generating unit 269, an accelerating electrode 272 and an ion exhausting portion 275. The stage 285 or the ion generator 266 is movable. The stage 285 or ion generator 266 moves and stops. Thus, the ion generator 266 can be switched ON such that the ion beam 277 forms an ion-altered area in the alignment layer 230 during a stop and is moved quickly across a portion of the alignment layer 230 while still being switched ON to form a non-altered area in the alignment layer 230. In the alternative, the ion generator 266 is switched OFF while the stage 285 or ion generator 266 is moving to form a non-altered area in the alignment layer 230, and the ion generator 266 is switched ON while the stage 285 or ion generator 266 is stopped to form an ion-altered area in the alignment layer 230.

In more detail, when the substrate 220 where the alignment layer 230 is formed is disposed on the stage 285 of the ion beam irradiating apparatus 260, the chamber 263 is put in a vacuum state by the vacuum pump (not shown) via the pipe 280. The degree of vacuum in the chamber 263 can be within a range of about $10^{-7}$ Torr to about 760 Torr. Subsequently, an inert gas is supplied into the ion generator 266, and ions are generated by the plasma generating unit 269. The ions are accelerated by the accelerating electrode 272, and the accelerated ions are exhausted through the ion exhausting portion 275. The exhausted ions through the ion exhausting portion 275 is referred to as the ion beam 277. The ion beam 277 is irradiated onto the alignment layer 230. The ion beam 277 has about $10^{11}$ to about $10^{13}$ doses per square centimeter (cm²) and has an energy of about 50 eV to about 2000 eV. The ions are accelerated by using a voltage of about 100 V to about 10 kV. The ion beam 277 can have an angle of about 30 degrees with respect to the surface of the substrate 220.

When the stage 285 moves while the ion generator 266 is an OFF state, a first area "A" remains on the alignment layer 230. Since the ion beam 277 is not irradiated onto the first area "A", the side chain 240 remains in the first area "A". On the other hand, when the stage 285 is stopped and the ion generator 266 is in an ON state, a second area "B" is formed onto the alignment layer 230. Since the ion beam 277 is irradiated onto the second area "B", the side chain 240 is altered in the second portion "B". The ion beam 277 is irradiated onto the second area "B" within an interval of about 0.1 sec to about 300 sec.

The first and second areas "A" and "B" are alternately disposed with each other. Width of the first and second areas "A" and "B" are controlled depending on a desired range of pre-tilt angle of liquid crystal (LC) molecules.

Figure 8:
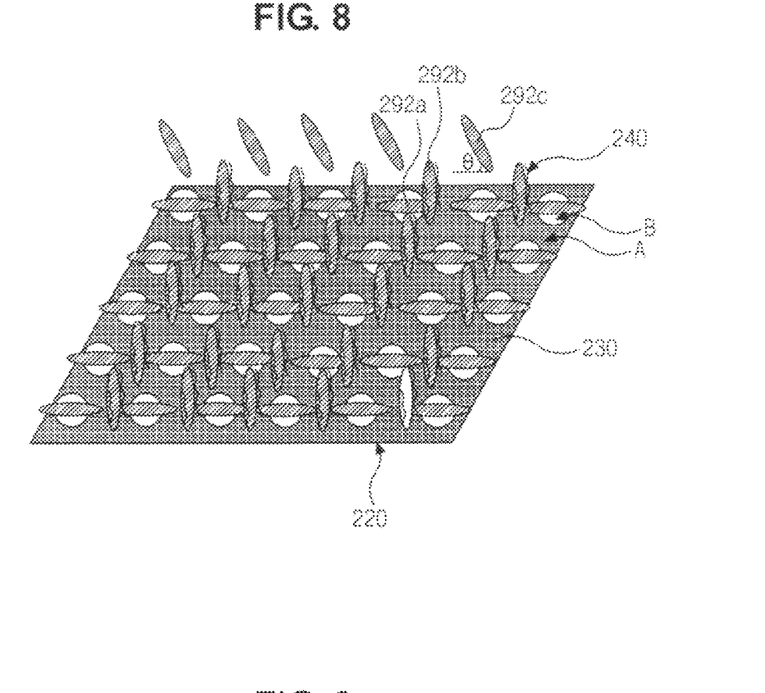
FIG. 8 is a schematic perspective view showing an initial arrangement of liquid crystal molecules on an aligned alignment layer.

Referring to FIG. 8 showing an initial arrangement of liquid crystal molecules on an aligned alignment layer, first LC molecules 292a adjacent to a surface of the alignment layer 230 and in the second area "B", where the side chains 240 are altered, and a second LC molecules 292b adjacent to a surface of the alignment layer 230 and in the first area "A", where the side chains 240 exists, have different pre-tilt angles. Since the side chains 240 are altered in the second area "B", the first LC molecules 292a have a first pre-tilt angle (not shown) of about 0 degree with respect to the alignment layer 230. Namely, a major axis of the first LC molecule 292a is substantially parallel to the alignment layer 230. On the other hand, since the side chains 240 exists in the first area "A", the second LC molecules 292b have a second pre-tilt angle (not shown) of about 90 degrees. Namely, a major axis of the second LC molecule 292b is substantially perpendicular to the alignment layer 230. A third LC molecules 292c adjacent to the first and second LC molecules 292a and 292b have a third pre-tilt angle "θ" greater than the first and second pre-tilt angles (not shown) because all of the LC molecules have an elastic property. Since a large portion of the LC molecules adjacent to the alignment layer 230 is the third LC molecules, the third LC molecules have a third pre-tilt angle "θ" are in mass since there are more third LC molecules than either first or second molecules.

Figure 9:
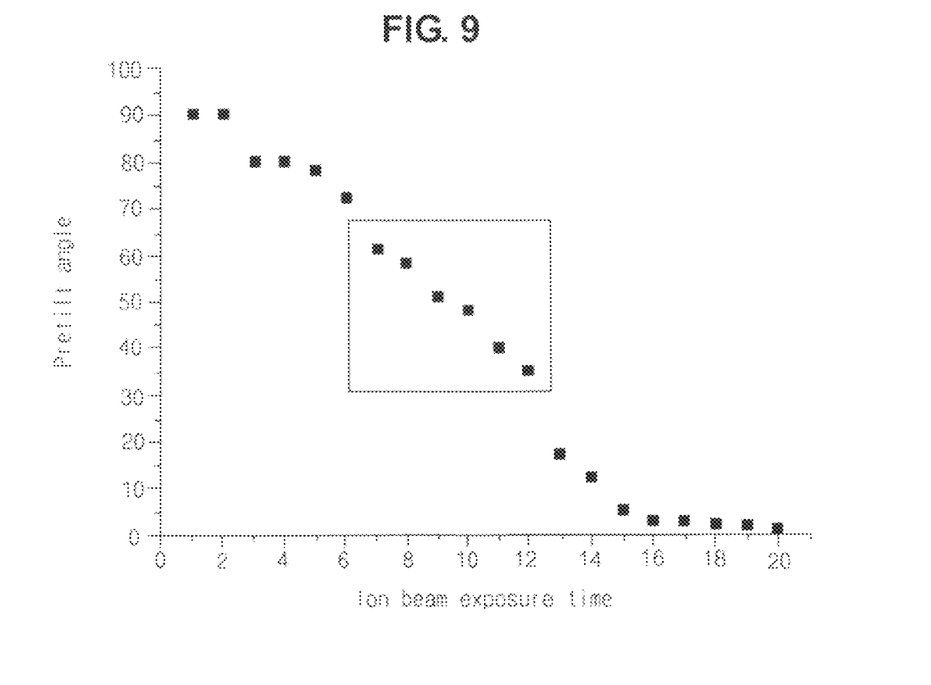
FIG. 9 is a graph showing a pre-tilt angle of a liquid crystal molecule on an alignment layer depending on an ion beam exposure time.

FIG. 9 is a graph showing a pre-tilt angle of a liquid crystal molecule on an alignment layer depending on an ion beam exposure time. A pre-tilt angle of a first LC molecule 292a (of FIG. 8) in the second area "B" (of FIG. 8) strongly depends on an ion beam exposure (irradiating) time. When the alignment layer is exposed to the ion beam by an interval being greater than about 20 sec, the first LC molecule 292a (of FIG. 8) has a pre-tilt angle of about 0 degree. On the other hand, when the alignment layer is not exposed to or is exposed to the ion beam by an interval being smaller than about 2 sec, the first LC molecule 292a (of FIG. 8) has a pre-tilt angle of about 90 degree. When the alignment layer is exposed by an interval between about 2 sec to about 20 sec, the first LC molecule 292a (of FIG. 8) has a pre-tilt angle within a range of about 0 degree to about 90 degree. Particularly, when the alignment layer is exposed by an interval between about 5.5 sec to about 12.5 sec, the first LC molecule 292a (of FIG. 8) has a pre-tilt angle within a range of about 40 degree to about 70 degree.

Figure 10:
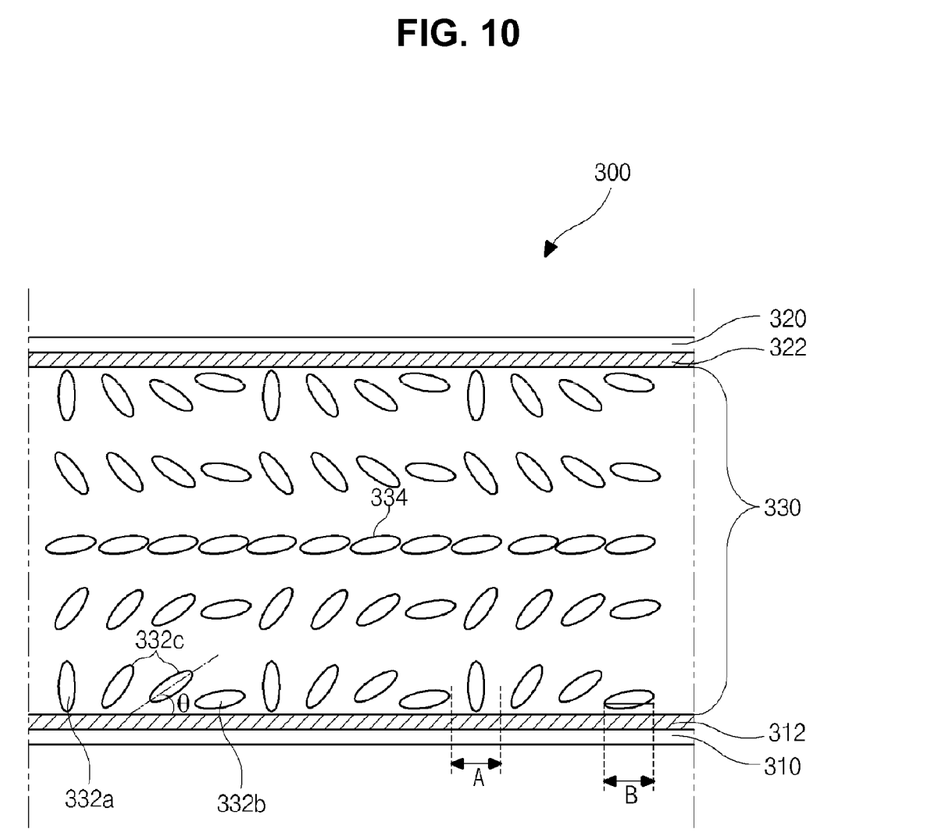
FIG. 10 is a schematic cross-sectional view of an OCB mode LCD device according to embodiments of the invention.

FIG. 10 is a schematic cross-sectional view of an OCB mode LCD device according to an embodiment of the invention. In FIG. 10, an OCB mode LCD device 300 includes a first substrate 310, a second substrate 320 and a liquid crystal (LC) layer 330. The first and second substrates 310 and 320 face each other. The LC layer 330 is interposed therebetween and includes a plurality of LC molecules 332a, 332b, 332c and 334. The LC molecules 334 are disposed at a center of the LC layer 330.

Although not shown, a plurality of gate lines and a plurality of data lines, a thin film transistor as a switching element and a pixel electrode are formed on the first substrate 310. The plurality of gate lines and the plurality of data lines cross each other to define a pixel region, and the thin film transistor is disposed at each pixel region. The pixel electrode is connected to the thin film transistor. A black matrix, a color filter layer including red, green and blue color filters, and a common electrode are formed on the second substrate 320. The black matrix corresponds to a non-display region, for example, the gate lines, the data line and the thin film transistor to shield light. Each of the red, green and blue color filters corresponds to each pixel region. The common electrode is formed on the black matrix and the color filter layer. The LC molecules 332a, 332b, 332c and 334 are driven by an electric field induced between the pixel and common electrodes.

In addition, first and second alignment layers 312 and 322 are formed over the first and second substrates 310 and 320, respectively. In more detail, the first and second alignment layers 312 and 322 are formed on the pixel and common electrodes, respectively. The first and second alignment layers 312 and 322 face each other such that the liquid crystal layer 330 is disposed therebetween. Each of the first and second alignment layers 312 and 322 functions in determining an initial arrangement of the LC molecules 332a, 332b, 332c and 334. The first and second alignment layers 312 and 322 can be formed of a vertical type polyimide.

In the OCB mode LCD device, there is characteristics in the arrangements of the LC molecules 332a, 332b and 332c adjacent to the first and second alignment layers 312 and 322. Here, the LC molecules adjacent to the first alignment layer are explained. First LC molecules 332a are initially arranged to be perpendicular to the first alignment layer 312 (or the first substrate 310). Namely, the first LC molecules 332a have a first pre-tilt angle (not shown) of about 90 degree with respect to the first alignment layer 312. Second LC molecules 332b are arranged to be parallel to the first alignment layer 312 (or the first substrate 310). Namely, the second LC molecules 332b have a second pre-tilt angle (not shown) of about 0 degree with respect to the first alignment layer 312. In addition, third LC molecules 332c disposed adjacent to the first and second LC molecules 332a and 332b are oblique to the first alignment layer 312 (or the first substrate 310). Namely, the third LC molecules 332c have a third pre-tilt angle θ within a range of about 20 to about 70 degree because the LC molecules have an elastic property. Accordingly, the average of the pre-tilt angle for the LC molecules 332a, 332b and 332c is about 20 to 70 degrees.

The first LC molecules 332a are disposed in a first area "A". Since an ion beam is not irradiated onto the first area "A" and the alignment layer 312 is a vertical type alignment layer, side chains, which protrude to be perpendicular to the first alignment layer 312, remain such that the first LC molecules 332a have the first pre-tilt angle of about 90 degrees. Second LC molecules 332b are disposed in the second area "B". Since the second area "B" is exposed to an ion beam, side chains are altered such that the second LC molecules 332b have the second pre-tilt angle of about 0 degree. As mentioned above, since the LC molecules have an elastic property, the third LC molecules 332c adjacent to the first and second LC molecules 332a and 332b have the third pre-tilt angle θ smaller than the first pre-tilt angle and greater than the second pre-tilt angle θ. Since a large portion of LC molecules adjacent to the alignment layer correspond to the third LC molecules 332c, it can be said that the third LC molecules having the third pre-tilt angle θ are in mass since there are more third LC molecules than either first or second LC molecules. The pre-tilt angle corresponds to an initial arrangement.

As explained, the OCB mode LCD device has advantages in response time and viewing angle. Unfortunately, since the related art OCM mode LCD device requires an initial voltage, there is a disadvantage in power consumption. However, in the OCB mode LCD device, since the LC molecules have a pre-tilt angle of about 20 to 70 corresponding to a pre-tilt angle in a bend-I state, it is possible to obtain fast response time without applying an initial voltage. Accordingly, the problem of large power consumption is overcome.

Moreover, since the LC molecules are symmetrically arranged with respect to a center line of the liquid crystal layer, a compensating plate is not required. Accordingly, there is an advantage in production cost.

In another embodiment, the second LC molecules 332b in the second area "B" where the ion beam is irradiated can have a second pre-tilt angle above 0 degree. Namely, the side chain in the second area "B" is altered such that the second LC molecules 332b in the second area "B" have the second pre-tilt angle above 0 degree. For example, the second LC molecules 332b have the second pre-tilt angle within a range of about 10 degrees to about 20 degrees. If other conditions are same, the third pre-tilt angle θ of the third LC molecules 332c depends on the second pre-tilt angle of the second LC molecules 332b. The second pre-tilt angle can be controlled by an ion beam exposure time or a density of the ion beam.

Further, the third pre-tilt angle of the third LC molecules 332c can be controlled by controlling a ratio of an area of the first area "A" to an area of the second area "B". The third pre-tilt angle θ of the third LC molecules 332c is in proportion to the ratio of the area of the first area "A" to the area of the second area "B". Namely, as the first area "A" has the larger area, the third LC molecules 332c has a larger pre-tilt angle. It is experimentally known that the third LC molecules 332c have a pre-tilt angle θ within a range of about 30 degrees to about 60 degrees when a ratio of an area of the first area "A" to an area of the second area "B" is 0.5~3:1 and the second LC molecules have a pre-tilt angle of about 0 degree. Moreover, a pre-tilt angle θ of the third LC molecules 332c can be controlled by controlling a pre-tilt angle of the second LC molecules and a ratio of an area of the first area "A" to an area of the second area "B".

It will be apparent to those skilled in the art that various modifications and variations can be made in the organic electroluminescent device and fabricating method thereof of embodiments of the invention without departing from the spirit or scope of the invention. Thus, it is intended that embodiments of the invention cover the modifications and variations of this invention provided they come within the scope of the appended claims and their equivalents.

What is claimed is:

1. A method of aligning an alignment layer for a liquid crystal display device, comprising:
   forming an alignment layer on a substrate such that the alignment layer has side chains protruding from a surface of the alignment layer;
   positioning the substrate with alignment layer on a stage of an ion beam irradiating apparatus;
   forming a non-altered area in the alignment layer by switching OFF an ion generator while one of the stage and ion generator is moving; and
   forming an ion-altered area in the alignment layer by switching ON the ion generator while the one of the stage and ion generator is stopped.

2. The method of aligning an alignment layer for a liquid crystal display device according to claim 1, further comprising:
   forming another ion-altered area in the alignment layer by switching ON the ion generator while the one of the stage and the ion generator is stopped again such that the non-altered area is disposed between two adjacent ion-altered areas.

3. The method of aligning an alignment layer for a liquid crystal display device according to claim 1, wherein the substrate is one of the array substrate and the color filter substrate.

4. The method of aligning an alignment layer for a liquid crystal display device according to claim 1, wherein the forming the ion-altered area in the alignment layer alters the side chains.

5. A method of aligning an alignment layer for a liquid crystal display device, comprising:
   forming an alignment layer on a substrate such that the alignment layer has side chains protruding from a surface of the alignment layer;
   positioning the substrate with alignment layer on a stage of an ion beam irradiating apparatus;
   forming an ion-altered area in the alignment layer by stopping one of the stage and ion generator while an ion generator is turned ON in a first interval; and
   forming a non-altered area in the alignment layer by moving one of the stage and ion generator while the ion generator is turned ON in a second interval shorter than the first interval.

6. The method of aligning an alignment layer for a liquid crystal display device according to claim 5, further comprising:
   forming another ion-altered area in the alignment layer by switching ON the ion generator while the one of the stage and ion generator is stopped again such that the non-altered area is disposed between two adjacent ion-altered areas.

7. The method of aligning an alignment layer for a liquid crystal display device according to claim 5, wherein the substrate is one of the array substrate and the color filter substrate.

8. The method of aligning an alignment layer for a liquid crystal display device according to claim 5, wherein the forming an ion-altered area in the alignment layer alters the side chains.

9. A liquid crystal display device, comprising:
   a first substrate having a black matrix, a color filter layer and a common electrode;
   a second substrate having gate lines, data lines and thin film transistors connected to pixel electrodes;
   a first alignment layer on the first substrate;
   a second alignment layer on the second substrate; and
   a liquid crystal layer having a plurality of liquid crystal molecules and positioned between the first and second alignment layers,
   wherein each of the first and second alignment layers has a first area with ion-altered side chains and a second area with non-altered side chains,
   wherein the liquid crystal molecules include first liquid crystal molecules having a first pre-tilt angle with respect to one of the first and second alignment layers in a clockwise direction, second liquid crystal molecules having a second pre-tilt angle with respect to the one of the first and second alignment layers in the clockwise direction, and third liquid crystal molecules having a third pre-tilt angle, which is smaller than the first pre-tilt angle and greater than the second pre-tilt angle, with respect to the one of the first and second alignment layers in the clockwise direction, wherein the first and second liquid crystal molecules are adjacent to the one of the first and second alignment layers, and the third liquid crystal molecules are adjacent to the first and second liquid crystal molecules, wherein the first liquid crystal molecules and the second liquid crystal molecules are alternately and horizontally arranged with each other in each pixel region, wherein the liquid crystal molecules further include fourth liquid crystal molecules having a fourth pre-tilt angle with respect to the other one of the first and second alignment layers in the clockwise direction, fifth liquid crystal molecules having a fifth pre-tilt angle with respect to the other one of the first and second alignment layers in the clockwise direction, and sixth liquid crystal molecules having a sixth pre-tilt angle, which is smaller than the fourth pre-tilt angle and greater than the fifth pre-tilt angle, with respect to the other one of the first and second alignment layers in the clockwise direction, and wherein the fourth and fifth liquid crystal molecules are adjacent to the other one of the first and second alignment layers, and the sixth liquid crystal molecules are adjacent to the fourth and fifth liquid crystal molecules.

10. The liquid crystal display device according to claim 9, wherein the first and second alignment layers are a vertical type.

11. The liquid crystal display device according to claim 9, wherein the first and second alignment layers have a plurality of first and second areas, and the first and second areas are alternately disposed with each other.

12. The liquid crystal display device according to claim 9, wherein the first and second alignment layers have a plurality of first and second areas, and the first areas have a different width than the second areas.

13. The liquid crystal display device according to claim 9, wherein the liquid crystal layer contains more third liquid crystal molecules than either second liquid crystal molecules or first liquid crystal molecules.

14. A liquid crystal display device, comprising:
a first substrate having a black matrix, a color filter layer and a common electrode;
a second substrate having gate lines, data lines and thin film transistors connected to pixel electrodes;
a first alignment layer on the first substrate;
a second alignment layer on the second substrate; and
a liquid crystal layer of liquid crystal molecules positioned between the first and second alignment layers,
wherein the liquid crystal molecules include first liquid crystal molecules having a first pre-tilt angle with respect to one of the first and second alignment layers in a clockwise direction, second liquid crystal molecules having a second pre-tilt angle with respect to the one of the first and second alignment layers in the clockwise direction, and third liquid crystal molecules having a third pre-tilt angle, which is smaller than the first pre-tilt angle and greater than the second pre-tilt angle, with respect to the one of the first and second alignment layers in the clockwise direction, wherein the first and second liquid crystal molecules are adjacent to the one of the first and second alignment layers, and the third liquid crystal molecules are adjacent to the first and second liquid crystal molecules, wherein the first liquid crystal molecules and the second liquid crystal molecules are alternately and horizontally arranged with each other in each pixel region, wherein the liquid crystal molecules further include fourth liquid crystal molecules having a fourth pre-tilt angle with respect to the other one of the first and second alignment layers in the clockwise direction, fifth liquid crystal molecules having a fifth pre-tilt angle with respect to the other one of the first and second alignment layers in the clockwise direction, and sixth liquid crystal molecules having a sixth pre-tilt angle, which is smaller than the fourth pre-tilt angle and greater than the fifth pre-tilt angle, with respect to the other one of the first and second alignment layers in the clockwise direction, and wherein the fourth and fifth liquid crystal molecules are adjacent to the other one of the first and second alignment layers, and the sixth liquid crystal molecules are adjacent to the fourth and fifth liquid crystal molecules.

15. The liquid crystal display device according to claim 14, wherein the first liquid crystal molecules correspond to first areas of the first and second alignment layers and the second liquid crystal molecules correspond to second areas of the first and second alignment layers.

16. The liquid crystal display device according to claim 15, wherein the first areas have a different width than the second areas.

17. The liquid crystal display device according to claim 15, wherein the first and second areas are alternately disposed with each other.

18. The liquid crystal display device according to claim 14, wherein the first pre-tilt angle is about 0 degree, the second pre-tilt angle is about 90 degrees, and the third pre-tilt angle is in a range of about 20 to 70 degrees such that the liquid crystal molecules in the liquid crystal layer are arranged into a bend-I state of an optically compensated bend mode for the liquid crystal display device.

19. The liquid crystal display device according to claim 14, wherein the liquid crystal layer has an average pre-tilt angle of about 20 to 70 degrees.

* * * * *